June 12, 1923.
W. J. SPRINGER ET AL
LUBRICATING PUMP
Filed June 9, 1921
1,458,369
2 Sheets-Sheet 2
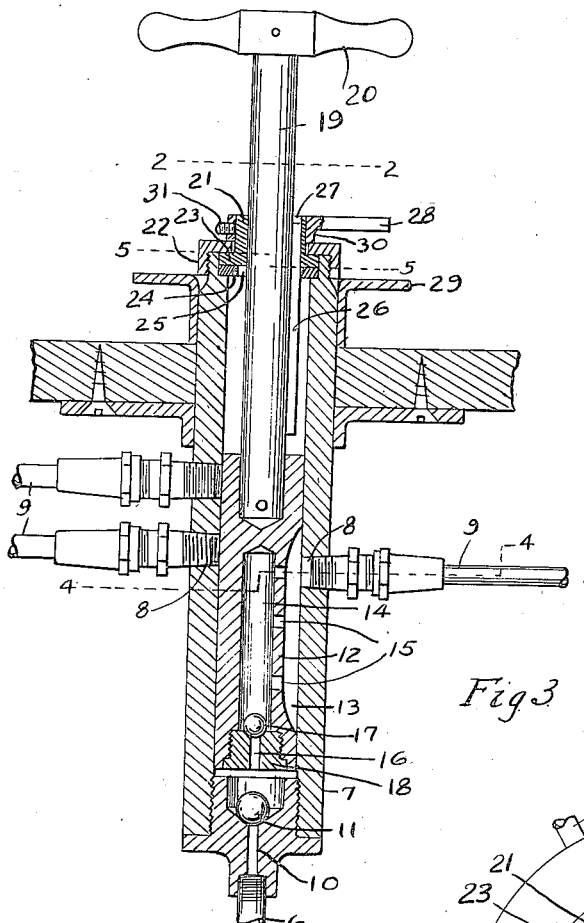
Fig 3
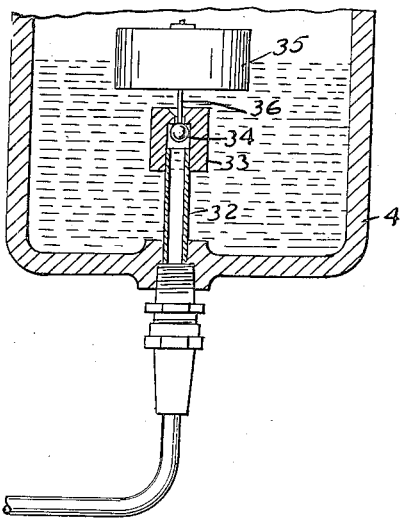
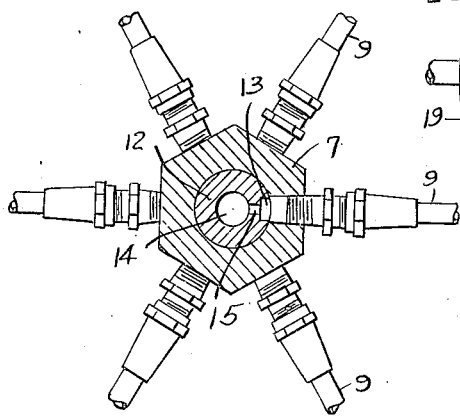
Fig 4
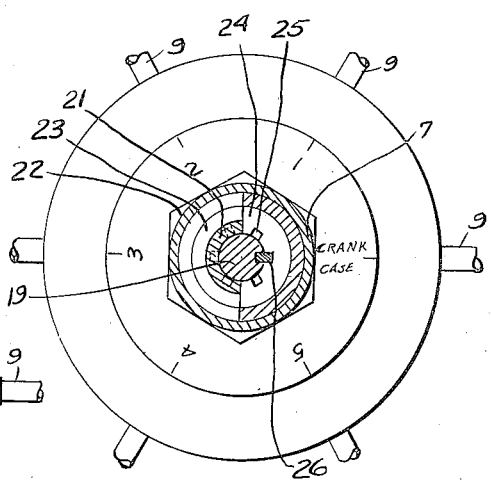
Fig 5.
Inventors
William J Springer
Albert C. Picard.
By B.J. Wheeler
Attorney Patented June 12, 1923.

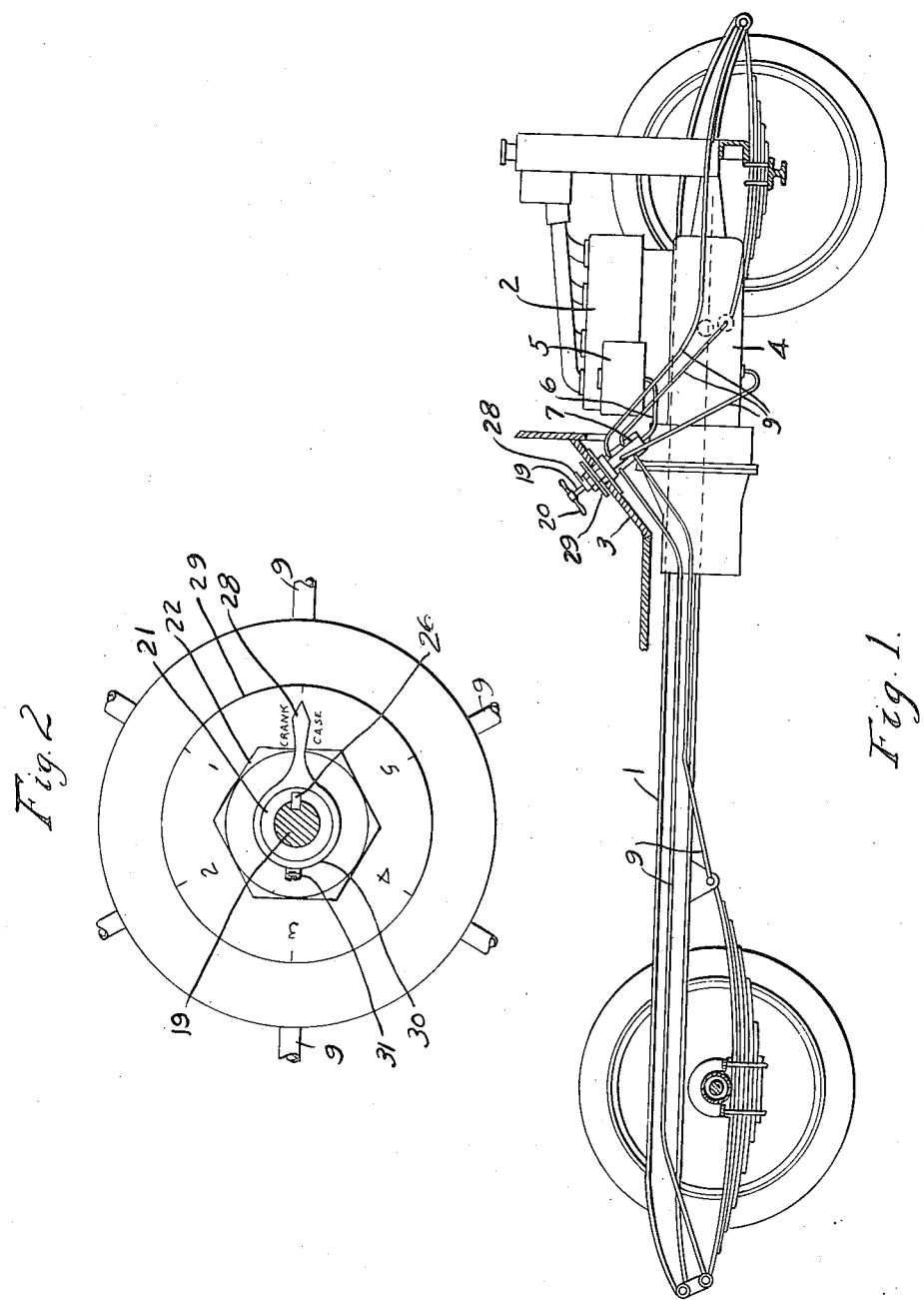

1,458,369

UNITED STATES PATENT OFFICE.

WILLIAM J. SPRINGER AND ALBERT C. PICARD, OF DETROIT, MICHIGAN.

LUBRICATING PUMP.

Application filed June 9, 1921. Serial No. 476,248.

*To all whom it may concern:*

Be it known that we, WILLIAM J. SPRINGER and ALBERT C. PICARD, citizens of the United States, residing at Detroit, in the county of Wayne and State of Michigan, have invented a new and useful Lubricating Pump, of which the following is a specification.

This invention relates to lubricant pumps, and relates particularly to pumps for lubricating various parts of motor vehicles.

It is the object of the invention to provide a pump having a plurality of discharge ports adapted to be connected to various parts of a motor vehicle or machine requiring lubrication, and to provide an adjustment means for quickly selectively effecting a discharge of lubricant through any of said ports.

A further object of the invention is to provide automatic means limiting the delivery of lubricant from the pump to the crank-case of the engine of a motor vehicle, said means being controlled preferably by the lubricant level in said crank-case, and insuring against an excess or inadequate quantity of lubricant therein.

In attaining these objects the invention contemplates providing a pump having its plunger rotatably adjustable as well as reciprocatory to permit the selective registration with a plurality of discharge ports formed in the casing, of a passage in the plunger connecting with the pressure chamber of the pump, a guide member being provided for the plunger restraining the same from rotation except in one of the limiting positions of reciprocation, and an indicating means being provided to define the rotative positions of the plunger bringing the respective discharge ports into use.

A preferred embodiment of the invention is hereinafter described and is illustrated in the accompanying drawings, wherein, Fig. 1 is a view in side elevation and partial section of a vehicle equipped with the improved pump for delivery of lubricant to the engine crank-case and various other parts.

Fig. 2 is a top view of the pump, the plunger rod or stem being cut away on line 2—2 of Fig. 3.

Fig. 3 is a view in sectional elevation of the pump and crank-case showing the lubricant delivery connection from the former to the latter.

Fig. 4 is a cross-section on line 4—4 of Fig. 3, cutting the plunger and the discharge port connected to the crank-case.

Fig. 5 is a cross-section on line 5—5 of Fig. 3, cutting the upper portion of the pump and disclosing primarily the provision for rotatively adjusting the plunger and its actuating rod to selectively bring the several discharge ports into use.

In these views the reference character 1 designates the frame, 2 the engine and 3 the foot-board of a motor vehicle, the crank-case of said engine being indicated at 4. 5 is a lubricant reservoir adapted to supply lubricant through a pipe 6 to the lower end of a pump cylinder or casing 7 mounted in any suitable manner in the foot board 3 of the vehicle. At circumferentially spaced points said cylinder is formed with a plurality of discharge ports 8 which are connected by pipes 9 to various parts of the vehicle to be lubricated, one of said pipes opening into the bottom of the crank-case 4. The intake port 10 of the pump is controlled by a ball check valve 11. Within the casing 7 of the pump a plunger 12 is mounted for reciprocation, said plunger being exteriorly formed with a longitudinal groove 13, and being rotatively adjustable, as will presently be described, to selectively establish said groove in communication with any of the discharge ports 8. Said plunger is interiorly formed with a longitudinally extended passage 14 with one or more outlets 15 extending radially to the groove 13, and having an inlet 16 controlled by a ball check valve 17, said inlet being formed axially in a plug 18 screw-threaded in the lower end of the plunger, and having communication with the pressure chamber of the pump.

In the operation of the pump, as so far described, the main check valve 11 is unseated on the upstroke of the plunger and the lubricant drawn into the casing 7 through the pipe 6 fills the pressure chamber below the plunger when the latter has completed its upstroke. On the down-stroke of the plunger the intake port 10 is closed by the valve 11, and the auxiliary check valve 17, which during the upstroke prevented the passage 14 from discharging lubricant below the plunger, is unseated, permitting the charge of lubricant drawn into the casing 7 on the upstroke to enter the passage 14 through the inlet 16 and to flow from said passage through the outlet or outlets 15 to the groove 13, the lubricant then discharging from the casing through that port 8 with which the groove 13 is in communication.

Considering now the actuating and adjusting means for the pump, 19 is a rod or stem secured to the upper end of the plunger 12 and projecting upwardly through the top of the casing, a suitable actuating handle 20 being terminally provided upon said rod. Said rod slides freely in a sleeve 21, rotatively mounted upon the upper end of the casing 7 and held in engagement with the casing by an interiorly flanged collar 22, exteriorly screw-threaded upon the casing, the flange of said collar overlapping an exterior flange 23 upon said sleeve. The flange 23 engages in a counterbore in the top of the casing, wherein it rests upon an annular disk 24 fixedly engaging the casing, as by a pressure fit in said counterbore. Said disk is interiorly formed with a plurality of notches 25 respectively in the radial planes of the ports 8, and said notches are selectively engageable by an elongated key 26 carried by the rod 19 and permanently loosely engaging in a key-way 27 formed interiorly of the sleeve 21. Thus, while the rod 19 may slide freely through said sleeve, the latter is constrained to turn with said rod when the latter is rotated. A pointer 28 rigidly carried by said sleeve co-acts with a circular index plate 29 fast upon the upper end of the casing 7, which plate has radial markings, as best seen in Fig. 5, indicating the positions to which the plunger 12 must be rotatively adjusted to bring the respective ports 8 into use. While the pointer 28 may be secured to the sleeve 21 in any manner, the drawings disclose said pointer as extending from a collar 30 embracing the sleeve and made rigid therewith by a set-screw 31.

To rotatively adjust the plunger 12 for selectively bringing the discharge ports 8 into use, it is necessary first to shift said plunger (by means of handle 20 and rod 19) to its limiting raised position. In said position the key 26 is upwardly withdrawn from the guide disk 24 and consequently the plunger rod and plunger may be rotated to register said key with any desired notch 25 of the disk 24. The sleeve 21, participating in such rotation (owing to permanent engagement of said key in the key-way 27) indicates, by means of the pointer 28 in conjunction with the fixed index plate 29, the proper rotative positions of the plunger rod for lubricating the desired parts of the vehicle. Any of said positions will be maintained, when the plunger is reciprocating, by engagement of said key 26 in the notch 25, corresponding to said position. The groove 13 is so proportioned in length as to insure its communication with the registered discharge port 8 throughout the entire stroke of the plunger.

The lubricant pipe 9 leading to the crank-case discharges into the latter through a pipe 32 rising a suitable distance above the crank-case bottom, and surmounted by a valve casing 33 having an outlet controlled by a ball valve 34. The latter is controlled by a float 35 to which it is connected by a stem 36. When the lubricant in the crank-case has reached its proper level the float 35 seats the valve 34 and the resulting resistance to further operation of the pump serves as an indication to the operator that the crank-case contains an adequate lubricant supply.

What we claim is:

1. A lubricant pump, comprising a casing, having an inlet and a plurality of circumferentially spaced discharge ports, a plunger rotatable and reciprocatory in said casing, formed with a passage for connecting the pressure chamber of the pump with one of said outlets, and means for reciprocating said plunger and for rotating the same to selectively register the outlet of said passage with any of said discharge ports.

2. A lubricant pump, comprising a casing, having an inlet and a plurality of circumferentially spaced discharge ports, a plunger rotatable and reciprocatory in said casing, formed with a passage for connecting the pressure chamber of the pump with one of said outlets, means for reciprocating said plunger and for rotating the same to selectively register the outlet of said passage with any of said discharge ports, and means for indicating the rotative positions of the plunger in which said discharge ports are brought into use.

3. A lubricant pump, comprising a casing, having an inlet and a plurality of circumferentially spaced discharge ports, a plunger rotatable and reciprocatory in said casing, formed with a passage for connecting the pressure chamber of the pump with one of said outlets, means for reciprocating said plunger and for rotating the same to selectively register the outlet of said passage with any of said discharge ports, a pointer rotative in unison with the plunger, and an index plate carried by the casing having markings with which said pointer is registrable through rotation of the plunger to determine the positions of the plunger bringing respective discharge ports into use.

4. A lubricant pump, comprising a casing, having an inlet and a plurality of circumferentially spaced discharge ports, a plunger rotatable and reciprocatory in said casing, formed with a passage for connecting the pressure chamber of the pump with one of said outlets, means for reciprocating said plunger and for rotating the same to selectively register the outlet of said passage with any of said discharge ports, a pointer rotative in unison with the plunger, an index plate carried by the casing having markings with which said pointer is registrable through rotation of the plunger to determine the positions of the plunger bringing respective discharge ports into use, and a common means for restraining the plunger from rotation in any of its reciprocative positions except in a limiting position of reciprocation.

5. A lubricant pump, comprising a casing having an inlet at one end, a plurality of circumferentially spaced lateral discharge ports, a plunger rotatable and reciprocatory in said casing, formed with a passage for connecting the pressure chamber of the pump with one of said discharge ports, an actuating rod for the plunger projecting from the casing, a sleeve rotatively mounted upon the casing and constrained to rotate in unison therewith, and co-acting indicating elements respectively carried by said sleeve and the casing for determining the rotative positions of the plunger bringing the respective discharge ports into use.

6. A lubricant pump, comprising a casing having an inlet and a plurality of circumferentially spaced discharge ports, a plunger rotatable and reciprocatory in said casing, formed with a passage for connecting the pressure chamber of the pump with one of said discharge ports, a rod for actuating said plunger, a guide member for said rod formed with notches having an angular spacing corresponding to that of said discharge ports, a key extending longitudinally upon the pump rod engageable in any one of said notches and disengaging from any thereof in a limiting position of the plunger to permit rotative adjustment of the latter to vary the engagement of said key with said notches, and indicating means for defining the positions of the plunger registering the outlet of its passage with the respective discharge ports.

In testimony whereof we sign this specification.

WILLIAM J. SPRINGER.
ALBERT C. PICARD.